United States Patent [19]

Kang

[11] Patent Number: 4,562,171
[45] Date of Patent: Dec. 31, 1985

[54] METHOD OF PREPARING HIGH CIS-1,4 DIENE POLYMERS HAVING GOOD GREEN STRENGTH AND TACK USING A CATALYST COMPOSITION CONTAINING A CARBOXYLATED METAL OXY ALUMINATE COMPONENT

[75] Inventor: Jung W. Kang, Clinton, Ohio

[73] Assignee: The Firestone Tire & Rubber Company, Akron, Ohio

[21] Appl. No.: 707,980

[22] Filed: Mar. 4, 1985

Related U.S. Application Data

[62] Division of Ser. No. 616,766, Jun. 4, 1984, Pat. No. 4,522,989.

[51] Int. Cl.$^4$ ................................................ C08F 4/70
[52] U.S. Cl. ...................................... 502/117; 502/119
[58] Field of Search ................................. 502/117, 119

[56] References Cited

U.S. PATENT DOCUMENTS

| | | | |
|---|---|---|---|
| 3,170,904 | 2/1965 | Ueda et al. | 502/117 X |
| 3,170,905 | 2/1965 | Ueda et al. | 502/154 X |
| 3,170,907 | 2/1965 | Ueda et al. | 502/117 X |
| 3,464,965 | 9/1969 | Yasunaga et al. | 526/133 |
| 3,471,462 | 10/1969 | Matsumoto et al. | 502/117 X |
| 3,483,177 | 12/1969 | Throckmorton | 502/117 X |
| 3,487,063 | 12/1969 | Throckmorton | 502/117 X |
| 3,528,957 | 9/1970 | Throckmorton | 502/117 X |
| 3,725,492 | 4/1973 | Urita et al. | 585/507 |
| 3,769,270 | 10/1973 | Saltman et al. | 502/117 X |
| 3,856,764 | 12/1974 | Throckmorton | 526/137 |
| 3,910,869 | 10/1975 | Throckmorton | 502/117 X |
| 3,985,941 | 10/1976 | Pierson et al. | 502/117 X |
| 4,304,885 | 12/1981 | Omori et al. | 560/236 |

FOREIGN PATENT DOCUMENTS 1499638   1/1978   United Kingdom .

Primary Examiner—Patrick P. Garvin
Attorney, Agent, or Firm—Frank J. Troy, Sr.

[57] ABSTRACT

Diene polymers having a high content of cis-1,4 addition are prepared by polymerizing a 1,3-diene monomer in a hydrocarbon solvent in the presence of a catalyst composition comprising (a) a carboxylated metal oxy aluminate compound in which the metal is nickel or cobalt, (b) an organometallic compound of a metal of Groups I, II, and III of the Periodic System, and (c) one or more fluorine containing compounds selected from the group consisting of boron trifluoride complexes with ethers, alcohols or mixtures thereof; hydrogen fluoride; hydrogen fluoride complexes with ethers, alcohols, or mixtures thereof and mixtures of said compounds.

The resultant polymers exhibit good green strength and tack and are particularly suitable for use as tire rubbers.

11 Claims, No Drawings

METHOD OF PREPARING HIGH CIS-1,4 DIENE POLYMERS HAVING GOOD GREEN STRENGTH AND TACK USING A CATALYST COMPOSITION CONTAINING A CARBOXYLATED METAL OXY ALUMINATE COMPONENT

This application is a division of application Ser. No. 616,766, filed June 4, 1984 and now U.S. Pat. No. 4,522,989.

BACKGROUND OF THE INVENTION

The invention relates to a method of preparing diene polymers having a high content of cis-1,4 addition along with good green strength and tack. More particularly, the invention relates to a method of preparing such polymers which involves polymerizing a 1,3-diene monomer in solution in the presence of a novel catalyst system which comprises a carboxylated metal oxy aluminate compound in which the metal is nickel or cobalt, an organometallic compound of a metal of Groups I, II, and III and one or more flourine containing compounds.

Polybutadiene polymers having a high content of cis-1,4 addition and methods for their preparation are known in the art. Such polymers have been produced by polymerizing 1,3-butadiene under solution polymerization conditions using a wide variety of catalyst systems including catalyst compositions composed of various organonickel or organocobalt compounds, organometallic compounds of metals of Group I, II, and III and various fluorine containing compounds.

Thus, U.S. Pat. No. 3,483,177 to Throckmorton, et al. relates to a method of preparing polybutadienes having a high content of cis-1,4 addition which comprises polymerizing 1,3-butadiene in solution in the presence of a catalyst system consisting of a mixture of: (1) organometallic compounds of the metals of Groups I, II, and III, including among which is disclosed trialkyl aluminum compounds; (2) at least one compound selected from the class consisting of organonickel or organocobalt compounds; and (3) at least one boron trifluoride complex prepared by complexing boron trifluoride with at least one member of the class selected from ketones, aldehydes, esters and nitriles, all members of the class having a carbon atom attached directly by a multiple bond to at least one atom selected from oxygen and nitrogen. At column 2, lines 13–21, there is described a prior art catalyst composition comprising triethyl aluminum, an organonickel salt and a boron trifluoride-diethyl ether complex.

U.S. Pat. No. 3,528,957 to Throckmorton, et al. relates to a method of preparing polybutadienes having a high content of cis-1,4 addition which comprises polymerizing 1,3-butadiene in solution in the presence of a catalyst system consisting of a mixture of: (1) organometallic compounds of metals of Groups, I, II, and III; (2) at least one compound selected from the class consisting of organonickel and organocobalt compounds; and (3) at least one boron trifluoride complex prepared by complexing boron trifluoride with a member of the class consisting of monohydric alcohols, phenols, water and mineral acids containing oxygen.

U.S. Pat. No. 3,985,941 to Pierson, et al. relates to a method of preparing polybutadienes having a high content of cis 1,4 addition which comprises polymerizing 1,3-butadiene in solution in the presence of a catalyst system consisting essentially of: (1) an organoaluminum compound selected from the group consisting of triisobutyl aluminum and tri-n-butyl aluminum; (2) an organonickel compound; and (3) a fluorinated mixture of hydrogen fluoride etherate and boron trifluoride etherate.

U.S. Pat. No. 4,304,885 to Omori, et al. relates to a polybutadiene rubber composition having high tack in the unvulcanized state which comprises a blend of a normally solid polybutadiene of high molecular weight with an extremely soft low molecular weight polybutadiene polymer. The patent discloses that both polymers are prepared by solution polymerization using various catalyst systems including catalyst systems consisting of organonickel compounds, trialkyl aluminum compounds and boron trifluoride etherates.

The aforementioned patents describe methods of preparing polybutadienes having high contents of cis-1,4 addition utilizing polymerization catalyst systems bearing some similarities to the catalyst systems employed in the method of the present invention.

However, there are a number of very important distinctions between the catalyst systems employed in the processes of this prior art and the catalyst systems used in the method of the invention which affect both the nature of the polymerization and the properties of the resultant polybutadiene polymers. Thus, none of the above mentioned patents disclose or suggest that the polybutadiene polymers produced by the methods described therein exhibit both good green strength and tack. In fact, as pointed out in U.S. Pat. No. 4,242,232, one of the major disadvantages of high cis-1,4 polybutadiene polymers produced by catalyst compositions of the prior art which utilize transition metals such as titanium, cobalt, and nickel, is inferior tack as compared to natural rubber.

U.S. Pat. No. 4,304,885 does teach that the polybutadiene rubber compositions described therein have high tack. However, in accordance with the teachings of the patent, this high tack property is achieved by blending a high molecular weight polybutadiene with a low molecular weight polybutadiene and this appears to be the case even though the reference recommends the use of catalyst systems for preparing the polymers which are at least analogous to those described in the above patents.

Moreover, U.S. Pat. No. 3,483,177; 3,528,957; and 3,985,941 all clearly teach that when certain boron trifluoride complexes, such as, for example, boron trifluoride etherates are employed in the catalyst system and the organometallic compound employed is a trialkyl aluminum compound, the selection of the trialkyl aluminum component is extremely limited. Thus, these patents all teach that in such instances the trialkyl aluminum compound should be limited to triethyl aluminum or trimethyl aluminum if optimum reaction rates and polymer molecular weights are to be obtained. This is in complete contrast to the catalyst composition of the present invention in which the trialkyl aluminum component is not so limited.

Finally, the organonickel or organocobalt components of the catalyst systems of the aforementioned prior art patents are entirely different from the carboxylated metal oxy aluminate component of the catalyst system of the present invention. As will be discussed hereinafter, this component of applicants' catalyst system is of major significance in producing polybutadienes having both a high content of cis-1,4 addition and good green strength and tack.

SUMMARY OF THE INVENTION

In accordance with the present invention, diene polymers having a high content (i.e., >85%) of cis-1,4 addition as well as good green strength and tack are prepared by polymerizing a 1,3-diene monomer in hydrocarbon solvent solution in the presence of a catalytically effective amount of a catalyst composition which comprises:
(a) a carboxylated metal oxy aluminate compound selected from the group consisting of compounds of the formula (RCOOMO—)$_3$AL and (RCOOMO—)$_2$AL—OR' and mixtures thereof, wherein R and R' are alkyl radicals containing from 7 to 17 carbon atoms, and M is nickel or cobalt;
(b) an organometallic compound of a metal of Groups I, II, and III of the Periodic System; and
(c) one or more fluorine containing compounds selected from the group consisting of boron trifluoride complexes with ethers, alcohols, or mixtures thereof; hydrogen fluoride; hydrogen fluoride complexes with ethers, alcohols, or mixtures thereof and mixtures of said compounds.

In addition to producing diene polymers having a high content of cis-1,4 addition, good green strength and tack, the catalyst compositions of the invention have considerably more versatility than those described in the aforementioned prior art. Thus, even in instances where the fluorine containing compound employed as component (c) of the composition is a boron trifluoride etherate, such as boron trifluoride diethyl ether and a trialkyl aluminum compound is employed as component (b), it is not necessary to limit the trialkyl aluminum component to trimethyl aluminum or triethyl aluminum. In fact, an especially advantageous trialkyl aluminum compound for use in such compositions is triisobutyl aluminum.

DETAILED DESCRIPTION OF THE INVENTION

As indicated, the high cis-1,4 diene polymers produced by the method of the invention are prepared by polymerizing a 1,3-diene monomer in the presence of the novel catalyst composition. 1,3-diene monomers which may be employed are conjugated dienes and include 1,3-butadiene, isoprene, 1,3-pentadiene and the like. The preferred 1,3-diene monomer is 1,3-butadiene.

The carboxylated metal oxy aluminate compounds which are employed as component (a) of the catalyst composition of the invention are compounds having either of the structures:

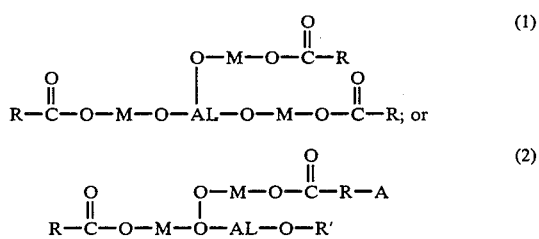

wherein R and R' are alkyl radicals containing from 7 to 17 carbon atoms, and M is nickel or cobalt. It should be noted that in certain instances, compounds in which R is less than 7 may be employed although the use of such compounds is not preferred due to their lack of solubility in hydrocarbon solvents. Nonetheless, such compounds may be utilized with certain mixtures of solvents. For the sake of convenience, these compounds may be represented by the shorthand formulae (RCOOMO—)$_3$AL or (RCOOMO—)$_2$ALOR', wherein R, R' and M are as defined above.

These carboxylated metal oxy aluminate compounds, such as the carboxylated nickel aluminate or the carboxylated cobalt aluminate, may be prepared by reacting a nickel or cobalt salt of a carboxylic acid with an alkoxide of aluminum using a procedure which is similar to that described in detail in U.S. Pat. No. 3,296,242, the disclosure of which is incorporated herein by reference. The preferred carboxylated metal oxy aluminate compounds employed in the catalyst compositions of the invention are those represented by the formula (RCOOMO—)$_3$AL, wherein M is nickel or cobalt and R is an alkyl radical of from 7 to 11 carbon atoms. Also, for the sake of convenience, the carboxylated metal oxy aluminate compounds of the invention are hereinafter referred to as simply cobalt aluminates and nickel aluminates which in the examples are designated by the abbreviations CoOAL and NiOAL, respectively.

The carboxylated nickel and cobalt aluminates of the catalyst compositions herein are believed to be completely distinguishable from the organonickel and organocobalt components of the catalyst compositions disclosed in the above-mentioned prior art patents. Thus, these compounds may, in fact, be regarded as semi-inorganic nickel and cobalt compounds in view of the presence of the central aluminum atom. Moreover, a surprising and unexpected feature of these cobalt and nickel aluminate compounds is that even in the absence of fluorine containing compound cocatalysts such as boron trifluoride complexes, these compounds, in the presence of an organometallic compound reducing agent such as trialkyl aluminum, exhibit some catalytic activity in the polymerization of 1,3-butadiene. This is in complete contrast to the organocobalt and organonickel compounds of the foregoing prior art patents which to applicants' knowledge exhibit virtually no catalytic activity in the absence of boron trifluoride complex cocatalysts and is further evidence of the fact that the carboxylated cobalt and nickel aluminates of the invention differ from the organocobalt and organonickel compounds of the prior art.

The organometallic compounds of Groups I, II, and III, which may be utilized as component (b) of the catalyst system, are organometallic compounds of metals such as lithium, potassium, sodium, zinc, magnesium and aluminum. The preferred organometallic compounds are the organolithium, organoaluminum, organozinc and organomagnesium compounds and of these, the organolithium and organoaluminum compounds are particularly preferred.

The term "organoaluminum compound", as employed herein, refers to organoaluminum compounds which correspond to the formula:

wherein R$_1$ is selected from the group consisting of alkyl (including cycloalkyl), aryl, alkaryl, arylalkyl, alkoxy, fluorine, and hydrogen, R$_2$ and R$_3$ being selected from the group of alkyl (including cycloalkyl), aryl, alkaryl, and arylalkyl.

Illustrative examples of compounds corresponding to the above formula which may be utilized include diethyl aluminum fluoride, di-n-propylaluminum fluoride, di-n-butylaluminum fluoride, diisobutylaluminum fluoride, dioctylaluminum fluoride, diphenylaluminum fluoride, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum, and other triorganoaluminum compounds. Also included are dialkylaluminum alkoxides such as diethylaluminum ethoxide, diisobutylaluminum ethoxide, dipropylaluminum methoxide, and the like. Hydrides of such organoaluminum compounds may also be utilized including diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and the like.

The preferred organoaluminum compounds are the trialkyl aluminum compounds such as trimethyl aluminum, triethyl aluminum, tri-n-propyl aluminum, tri-n-butyl aluminum, triisobutyl aluminum, trioctyl aluminum and the like, and of these, triisobutyl aluminum is particularly preferred.

The term "organolithium compounds", as employed herein, refers to organolithium compounds which correspond to the formula RLi, wherein R is a hydrocarbyl radical of 1-20 carbon atoms, advantageously an aliphatic radical of 1-20, preferably 3-6 carbon atoms, but also may be cycloaliphatic or aromatic of 6-20, preferably 6-12 carbon atoms. Preferred RLi compounds are n-butyl and sec-butyl lithium. Other suitable RLi compounds include but are not restricted to those in which the R groups are ethyl, n-propyl, isopropyl, n-amyl, sec-amyl, sec-hexyl, n-hexyl, n-heptyl, octyl, nonyl, decyl, dodecyl, octadecyl, phenyl, tolyl, dimethylphenyl, ethylphenyl, naphthyl, cyclohexyl, methylcyclohexyl, ethylcyclohexyl, cycloheptyl, allyl, 2-butenyl, 2-methyl butenyl, cyclopentylmethyl, methylcyclopentylethyl, phenylethyl, cyclopentadienyl, naphthyl, penylcyclohexyl, and the like.

The term "organomagnesium compounds" as employed herein refers first to organomagnesium complexes corresponding to the formula $R_aMgX_b$, wherein R may be alkyl, aryl, arylalkyl or alkaryl; X is fluorine and a and b are mole fractions whose sum equals 2 while the ratio a/b is greater than 2 but is not infinite. Illustrative of compounds corresponding to the above formula are ethylmagnesium fluoride, cyclohexylmagnesium fluoride, and phenylmagnesium fluoride and the like. Also included in the term "organomagnesium compounds" are compounds of the formula $R_2Mg$, wherein R may be alkyl, aryl, arylalkyl or alkaryl or R'R''Mg, wherein R' may be alkyl, aryl or alkaryl and R'' may be either alkyl, aryl, arylalkyl or alkaryl. Illustrative of compounds corresponding to these latter formulae are dimethylmagnesium, diethylmagnesium, dipropylmagnesium, di-(n-s-t)butylmagnesium, diphenylmagnesium, and the like.

The term "organozinc compounds", as employed herein, refers to organozinc compounds corresponding to the formula $R_2Zn$, wherein R may be alkyl, aryl, arylalkyl or alkaryl. Illustrative of compounds corresponding to the above formula are diethylzinc, dibutylzinc, and diphenylzinc.

Fluorine containing compounds which may be utilized as component (c) of the catalyst compositions herein include boron trifluoride complexes with ethers, alcohols or mixtures thereof; hydrogen fluoride and hydrogen fluoride complexes with ethers, alcohols or mixtures thereof. Mixtures of the foregoing fluorine containing compounds may also be employed. The preferred fluorine containing compounds for use in the catalyst composition of the invention are the boron trifluoride complexes.

Ethers which may be utilized in forming the complexes may be represented by the formula R'OR wherein R and R' are selected from the group consisting of alkyl, cycloalkyl, aryl, alkaryl and arylalkyl radicals containing from 1 to 30 carbon atoms and R and R' may be the same or different. The R's may also be joined through a common carbon bond to form a cyclic ether with the ether oxygen being an integral part of the cyclic structure such as tetrahydrofuran, furan, or dioxane. Illustrative examples of ethers which may be suitably employed include dimethyl, diethyl, dibutyl, diamyl, and diisopropyl ethers, ethyl methyl ether, dibenzyl ether and the like. The preferred ether complexes are boron trifluoride diethyl etherate, boron trifluoride dibutyl etherate, hydrogen fluoride diethyl etherate and hydrogen fluoride dibutyl etherate.

Alcohols which may be utilized in forming the complexes may be represented by the formula ROH wherein R is selected from the group consisting of alkyl, cycloalkyl, aryl, and arylalkyl radicals containing from 1 to 30 carbon atoms. Illustrative examples of alcohols which may be suitably employed include methanol, ethanol, n-propanol, isopropanol, n-butanol, hexanol, cyclohexanol, pentanol, octanol, decanol, dodecanol, benzyl alcohol, 2-phenol and the like. The preferred alcohol complexes are $BF_3$.Ethanol, $BF_3$.Octanol, HF.Ethanol and HF.Octanol and of these $BF_3$.Ethanol and $BF_3$.Octanol are particularly preferred.

The complexes may be prepared by various procedures. Thus, the boron trifluoride or hydrogen fluoride complexes may be prepared by simply dissolving appropriate amounts of the ether or alcohol complexing agents in a suitable solvent and appropriate amounts of catalyst may also be preformed outside of the polymerization system by a procedure in which all of the catalyst components are mixed in the presence of a small amount of 1,3-diene monomer in an inert diluent and the complete blend is then added to the polymerization system. Additionally, the catalyst components may be introduced to the polymerization system using a two stage procedure in which a π allyl nickel or cobalt complex is preformed outside the reactor in the first stage. This procedure involves first charging the organometallic component, preferably in an inert diluent, to a blend or solution of 1,3-diene in an inert diluent. Then, the nickel aluminate or cobalt aluminate compound, preferably in an inert diluent, is added to the system. The resulting blend is then heated at an appropriate temperature (e.g., from about −20° C. to about 80° C.) for an appropriate time (e.g., from about 0 to about 30 minutes) to form the π allyl nickel or cobalt complex, the formation of which is generally evidenced by the solution taking on a pale yellow to orange color. Following this step, the fluorine containing compound and preformed π allyl complex are added to the polymerization system. In addition, the π allyl complex may be formed in-situ in the reactor by charging the organometallic compound and cobalt aluminate or nickel aluminate compound to a reactor containing the 1,3-diene to be polymerized and then heating the resultant mixture. These latter procedures involving the formation of the π allyl complex are the preferred procedures for use in the present invention.

The concentration of the total catalyst composition employed in the method of the invention can vary considerably and is dependent upon factors such as purity, rate of polymerization desired, temperature, and the boron trifluoride or hydrogen fluoride in a suitable solvent and then mixing the two solvent systems. The mixing should be conducted in the absence of water vapor. An additional method would be to dissolve the boron trifluoride or hydrogen fluoride in a suitable solvent and then add the alcohol or ether to the resulting solution. Alternatively, the complexes could be prepared by dissolving the alcohol or ether complexing agent in a suitable solvent and then bubble the gaseous boron trifluoride or hydrogen fluoride through the system until all of the complexing agent has reacted. As illustrated in certain of the examples below, the boron trifluoride-alcohol complexes can also be prepared by means of a substitution reaction in which the alcohol is reacted with a boron trifluoride-ether complex.

The three catalyst components interreact to form the active catalyst. Accordingly, the optimum concentration for any one component is dependent upon the concentration of each of the other components. In the catalyst system of this invention, the polymerization of a 1,3-diene monomer to diene polymer may be conducted using a broad range of catalyst component concentrations. Thus, the molar ratio of catalyst components a:b:c (defined above) may range from about 1:1:1 to about 1:70:70. The preferred molar ratios of a:b:c are from 1:1.5:1.5 to 1:15:15.

The three catalyst components may be introduced into the polymerization system in several ways. Thus, the three catalyst components may be charged to a solution of the 1,3-diene in a stepwise or simultaneous manner which is commonly referred to in the polymerization art as an "in-situ" catalyst charge procedure. Alternatively, the the like. Accordingly, specific overall concentrations of the catalyst compositions cannot be set forth except to state that such concentrations are catalytically effective amounts. Some specific concentrations and ratios which produce polybutadiene polymers having the desired properties are illustrated in the examples below.

The polymerizations of this invention are conducted in an inert hydrocarbon solvent and are consequently solution polymerizations. The term "inert solvent" means that the solvent does not enter into the structure of the resulting polymer, does not adversely affect the properties of the resulting polymer and does not adversely affect the activity of the catalyst employed. Suitable hydrocarbon solvents which may be employed include aliphatic, aromatic or cyloaliphatic hydrocarbons such as hexane, pentane, toluene, benzene, cyclohexane and the like. The preferred hydrocarbon solvents are aliphatic hydrocarbons and of these hexane is particularly preferred.

The polymerization of the invention should be carried out under an inert atmosphere such as nitrogen and precautions should be taken to exclude materials such as water and air which will deactivate the catalyst components.

The temperatures employed in the polymerization are not critical and may range from about −10° C. to about 150° C. Preferred polymerization temperatures may range from about 50° C. to about 130° C. It should be noted here that one of the significant advantages of the use of the catalyst compositions of the invention is that they provide the capability of more consistently using higher polymerization temperatures than those which have heretofore been actually exemplified in most prior art catalyst systems.

The polymerizations may be terminated in well known manner by the addition of a small amount of a lower alkanol such as methanol and an antioxidant such as di-t-butyl cresol.

The diene polymer product can be recovered from solution in known manner by coagulation in an excess of methanol or other lower alkanol. The polymer product can be dried using any convenient method such as vacuum drying, drum drying, extruder drying, and the like.

As mentioned above, the diene polymers produced by the method of the invention have a high content of cis-1,4 addition along with good green strength and tack. Thus, such diene polymers have cis-1,4 addition contents of >85% and more commonly from about 90 to about 99%.

The following examples are submitted for the purpose of further illustrating the nature of the present invention and are not to be regarded as a limitation on the scope thereof. Parts and percentages shown in the examples are by weight unless otherwise indicated.

Examples A which follows illustrates the preparation of the carboyxlated nickel oxy aluminate component of the catalyst composition of the invention.

EXAMPLE A

PREPARATION OF TRIS(OCTANOATO NICKEL OXY)ALUMINUM NiOAL

Aluminum isopropoxide (69.4 g, 0.34 mole) and commercial oil-extended nickel octanoate (500 g, 12 weight percent, 1.02 mole based on metallic nickel) were charged to a two liter three-necked round flask equipped with a mechanical stirrer, and inlet and outlet nitrogen lines. The resultant suspension was stirred at 180° C. under nitrogen for three (3) hours to remove the volatile materials. After the reaction was completed, the mixture was allowed to stand at room temperature. To the resultant dark green mixture was added 2 liters of dry hexane and the mixture was dissolved at room temperature with stirring. The resultant solution was filtered to remove the insoluble materials and the filtrate was dried over Molecular Sieves. The resultant product was analyzed with the following results:

mM Ni per ml=0.62
mM AL per ml=0.21
Ratio of Ni:Al=2.95:1

The corresponding cobalt aluminate can be prepared by employing substantially the same procedure.

The following examples (1-27) illustrate the preparation of high cis-1,4 polybutadienes using the catalyst compositions of the invention.

tion conditions and polymer properties are shown in Tables I and I-A.

TABLE I

| Example # | 1 | 2 | 3 | 4 | 5 | 6 |
|---|---|---|---|---|---|---|
| 1,3-BD, % | 25.2 | 25.2 | 25.2 | 25.2 | 25.2 | 25.2 |
| 1,3-BD, grams | 80.6 | 80.6 | 80.6 | 80.6 | 80.6 | 80.6 |
| EtOH, mM phgm | — | 0.50 | 0.75 | 1.00 | 1.25 | 1.50 |
| TIBAL, mM phgm | 0.5 | 0.5 | 0.5 | 0.5 | 0.5 | 0.5 |
| NiOAL, mM phgm | 0.5 | 0.5 | 0.5 | 0.5 | 0.5 | 0.5 |
| BF$_3$OEt$_2$, mM phgm | 0.5 | 0.5 | 0.5 | 0.5 | 0.5 | 0.5 |
| Molar Ratios: | 1:1:1 | → | → | → | 1:1:1 | 1:1:1 |
| EtOH/Ni | — | 1:1 | 1.5:1 | 2:1 | 2.5:1 | 3:1 |
| Type Catalyst Addition | In-situ | → | → | → | In-situ | In-situ |
| Polymerization Conditions: | | | | | | |
| Temp °C. | 50 | 50 | 50 | 50 | 50 | 50 |
| Time-Min. | 60 | 60 | 60 | 60 | 60 | 60 |
| Conversion % | 85.7 | 90.7 | 87.2 | 89.9 | 69.6 | 49.4 |
| Polymer Properties Microstructure | | | | | | |
| % Cis-1,4 | 96.0 | 98.5 | 98.9 | 98.9 | 99.2 | 99.3 |
| % Trans-1,4 | 3.3 | 0.8 | 0.2 | 0.2 | 0.1 | 0.2 |
| % 1,2 | 0.7 | 0.7 | 0.9 | 0.9 | 0.7 | 0.5 |
| DSV | 1.22 | 1.64 | 2.07 | 2.29 | 2.73 | 3.03 |
| % Gel | 0 | 0 | 0 | 0 | 0 | 0 |

EXAMPLES 1-6

To 28 ounce beverage bottles equipped with rubber liner and three hole crown cap were charged 320 grams of purified BD/hexane blends (25.2 percent by weight 1,3-butadiene). Then, the catalyst components were charged to each bottle in the following order: (1) ethanol in hexane (1.0 molar solution); (2) triisobutyl aluminum, hereinafter TIBAL, (18 weight %) in hexane; (3) NiOAL (0.62 molar) in hexane, and boron trifluoride diethyl ether, hereinafter BF$_3$OEt$_2$, (neat). The molar ratios of ethanol to NiOAL were varied. After addition of catalyst components were completed, the polymerization was conducted at 50° C. in a water bath for 60 minutes. Polymerization was terminated with a small amount of methanol and an antioxidant. The resultant polymer was recovered by coagulation with excess methanol and dried using a drum drier.

The weights and molar ratios of the various catalyst components used in the polymerization, the polymerization conditions and polymer properties are shown in Tables I and I-A.

EXAMPLES 7-12

In these examples, the preformed catalyst ($\pi$-allyl nickel) in a BD/hexane blend was prepared with and/or without ethanol. To 28 ounce beverage bottles equipped with rubber liner and three hole crown cap were charged 320 grams of purified BD/hexane blends (25.2 percent by weight 1,3-butadiene). Then, the catalyst components were charged to each bottle in the following order: (1) TIBAL (18 weight %) in hexane; (2) ETOH (1 molar) in hexane and (3) NiOAL in hexane. The mixture was tumbled at 50° C. in a water bath for 60 minutes. After cooling the mixture at room temperature for 30 minutes, BF$_3$OEt$_2$ (neat) was charged to each bottle. The polymerization was conducted at 50° C. in a water bath for 60 minutes. Polymerization was terminated with a small amount of methanol and an antioxidant. The resultant polymer was recovered and dried as described in Examples 1-6.

The weights and molar ratios of the various catalyst components used in the polymerization, the polymerization conditions and polymer properties are shown in Tables II and II-A.

TABLE II

| Example # | 7 | 8 | 9 | 10 | 11 | 12 |
|---|---|---|---|---|---|---|
| 1,3-BD, % | 25.2 | 25.2 | 25.2 | 25.2 | 25.2 | 25.2 |
| 1,3-BD, grams | 80.6 | 80.6 | 80.6 | 80.6 | 80.6 | 80.6 |
| TIBAL, mM phgm | 0.4 | 0.4 | 0.4 | 0.4 | 0.4 | 0.4 |
| EtOH, mM phgm | — | 0.4 | 0.6 | 0.8 | 1.0 | 1.2 |
| NiOAL, mM phgm | 0.4 | 0.4 | 0.4 | 0.4 | 0.4 | 0.4 |
| BF$_3$OEt$_2$, mM phgm | 0.4 | 0.4 | 0.4 | 0.4 | 0.4 | 0.4 |
| Molar Ratios: | | | | | | |
| Ni/AL/B | 1:1:1 | → | → | → | 1:1:1 | 1:1:1 |
| EtOH/Ni | — | 1:1 | 1.5:1 | 2.0:1 | 2.5:1 | 3.0:1 |
| Type Catalyst Additions | | | | | | |
| (1) AL/EtOH/Ni | Preformed | → | → | → | Preformed | Preformed |
| Temp °C. | 50 | 50 | 50 | 50 | 50 | 50 |
| Time-Min. | 60 | 60 | 60 | 60 | 60 | 60 |
| (2) BF$_3$OEt$_2$ | → | → | → | → | → | → |
| Polymerization Conditions: | | | | | | |
| Temp °C. | 50 | 50 | 50 | 50 | 50 | 50 |
| Time-Min. | 60 | 60 | 60 | 60 | 60 | 60 |
| Conversion % | 94.6 | 96.4 | 97.0 | 97.7 | 98.1 | 98.2 |
| Polymer Properties Microstructure | | | | | | |

TABLE II-continued

| Example # | 7 | 8 | 9 | 10 | 11 | 12 |
|---|---|---|---|---|---|---|
| % Cis-1,4 | 97.8 | 97.4 | 97.5 | 97.4 | 97.6 | 97.5 |
| % Trans-1,4 | 1.8 | 2.2 | 2.1 | 2.0 | 1.6 | 1.6 |
| % 1,2 | 0.4 | 0.4 | 0.4 | 0.6 | 0.8 | 0.9 |
| DSV | 1.95 | 1.99 | 2.06 | 2.09 | 2.21 | 2.24 |
| % Gel | 0 | 0 | 0 | 0 | 0 | 0 |

EXAMPLES 13–18

In these examples, Example 1 was substantially repeated with the exceptions that other organoalkyl aluminums were employed as a reducing agent.

The weights and molar ratios of the various components used in the polymerization, the polymerization conditions, and the properties of the resultant polymer are shown in Tables III and III-A.

EXAMPLES 17–24

In these examples, Example 7 was substantially repeated except that n-octanol was used in place of ethanol. The weights and molar ratios of the various components used in the polymerization, the polymerization conditions, and the properties of the resultant polymers are shown in Tables IV and IV-A.

TABLE III

| Example # | 13 | 14 | 15 | 16 | 17 | 18 |
|---|---|---|---|---|---|---|
| 1,3-BD, % | 25.2 | 25.2 | 25.2 | 25.2 | 25.2 | 25.2 |
| 1,3-BD, grams | 80.6 | 80.6 | 80.6 | 80.6 | 80.6 | 80.6 |
| TEA*, mM phgm | 0.5 | 0.5 | — | — | — | — |
| TIBAL, mM phgm | — | — | 0.5 | 0.5 | — | — |
| DIBAL-H**, mM phgm | — | — | — | — | 0.5 | 0.5 |
| EtOH, mM phgm | — | 1.0 | — | 1.0 | — | 1.0 |
| NiOAL, mM phgm | 0.5 | 0.5 | 0.5 | 0.5 | 0.5 | 0.5 |
| BF₃OEt₂, mM phgm | 0.5 | 0.5 | 0.5 | 0.5 | 0.5 | 0.5 |
| Molar Ratios: | | | | | | |
| Ni/AL/B | 1:1:1 | → | → | → | 1:1:1 | 1:1:1 |
| EtOH/Ni | — | 2:1 | — | 2:1 | — | 2:1 |
| Type Catalyst Addition | In-situ | | | | In-situ | In-situ |
| Polymerization Conditions: | | | | | | |
| Temp °C. | 50 | 50 | 50 | 50 | 50 | 50 |
| Time-Min. | 60 | 60 | 60 | 60 | 60 | 60 |
| Conversion % | 86.5 | 95.2 | 85.6 | 95.5 | 73.6 | 93.8 |
| Polymer Properties Microstructure | | | | | | |
| % Cis-1,4 | 98.6 | 99.3 | 98.5 | 99.2 | 98.2 | 98.9 |
| % Trans-1,4 | 0.7 | 0.3 | 1.0 | 0.3 | 1.1 | 0.5 |
| % 1,2 | 0.7 | 0.4 | 0.5 | 0.5 | 0.7 | 0.6 |
| DSV | 1.95 | 3.35 | 2.25 | 3.15 | 2.15 | 3.13 |
| % Gel | 0 | 0 | 0 | 0 | 0 | 0 |

*TEA means triethyl aluminum
**DIBAL-H means Diisobutyl aluminum hydride

TABLE IV

| Example # | 19 | 20 | 21 | 22 | 23 | 24 |
|---|---|---|---|---|---|---|
| 1,3-BD, % | 24.5 | 24.5 | 24.5 | 24.5 | 24.5 | 24.5 |
| 1,3-BD, grams | 76 | 76 | 76 | 76 | 76 | 76 |
| TIBAL, mM phgm | 0.55 | 0.55 | 0.55 | 0.55 | 0.55 | 0.55 |
| n-Octanol, mM phgm | 0.55 | 0.83 | 1.10 | 1.38 | 1.65 | 1.93 |
| NiOAL, mM phgm | 0.55 | 0.55 | 0.55 | 0.55 | 0.55 | 0.55 |
| BF₃OEt₂, mM phgm | 0.55 | 0.55 | 0.55 | 0.55 | 0.55 | 0.55 |
| Molar Ratios: | | | | | | |
| Ni/AL/B | 1:1:1 | → | → | → | 1:1:1 | 1:1:1 |
| n-Octanol/Ni | 1.1 | 1.5:1 | 2.0:1 | 2.5:1 | 3.0:1 | 3.5:1 |
| Type Catalyst Additions: | | | | | | |
| (1) AL/Octanol/B | Preformed | → | → | → | Preformed | Preformed |
| Temp °C. | 50 | 50 | 50 | 50 | 50 | 50 |
| Time-Min. | 60 | 60 | 60 | 60 | 60 | 60 |
| (2) BF₃OEt₂ | → | → | → | → | → | → |
| Polymerization Conditions: | | | | | | |
| Temp °C. | 50 | 50 | 50 | 50 | 50 | 50 |
| Time-Min. | 60 | 60 | 60 | 60 | 60 | 60 |
| Conversion % | 96.1 | 96.5 | 95.7 | 97.5 | 97.7 | 97.3 |
| Polymer Properties Microstructure | | | | | | |
| % Cis-1,4 | 98.5 | 98.7 | 99.3 | 98.7 | 98.9 | |
| % Trans-1,4 | 0.8 | 0.6 | 0.3 | 0.7 | 0.6 | |
| % 1,2 | 0.7 | 0.7 | 0.4 | 0.6 | 0.5 | |
| DSV | 1.48 | 1.55 | 2.12 | 2.76 | 3.20 | |
| % Gel | 0 | 0 | 0 | 0 | 0 | |

TABLE IV-continued

| Example # | 19 | 20 | 21 | 22 | 23 | 24 |
|---|---|---|---|---|---|---|
| Mw ($\times 10^{-5}$) | 2.17 | 2.53 | 3.40 | 4.80 | 5.52 | |
| Mw/Mn | 2.97 | 3.54 | 3.19 | 4.18 | 4.22 | |

EXAMPLES 25–27

To a 2 gallon stainless steel reactor equipped with thermometer, stirrer, heating means, pressure means, inlet and outlet ports which was maintained under a nitrogen atmosphere was charged 3632 grams of a purified 1,3-butadiene/hexane blend containing 760.0 grams of 1-3-butadiene.

The active catalyst was performed outside of the reactor by charging the following components to a 28 ounce crown capped beverage bottle in the following order: (1) 200 mililiter (ml) of a 1,3-butadiene/hexane blend containing 10 percent by weight 1,3-butadiene; (2) EtOH in hexane; (3) TIBAL (18 weight percent) in hexane; (4) NiOAL in hexane and (5) BF$_3$OEt$_2$ (neat). The resultant preformed catalyst was an orange color indicating the formation of acting $\pi$-allyl-nickel complex.

Then, the resultant preformed catalyst was immediately charged to the reactor at room temperature. Polymerization was conducted at 85±5° C. for a period of 3–7 hours. Polymerization was then terminated by adding a small amount of isopropanol and an antioxidant to the reactor. The resultant polymer was recovered from solution by coagulation in excess isopropanol and dried by drum drying.

The weights and molar ratios of the various components used in the polymerization, the polymerization conditions, and the properties of the resultant polymer are shown in Table V. The polymers produced in these examples were also evaluated for green strength which refers to the strength, cohesiveness and dimensional stability of rubber compounds in the unvulcanized state, and tack.

Green strength and tack were determined in known manner by compounding the polymers using conventional rubber compounding procedures and equipment utilizing a standard rubber formulation having the following recipe in parts by weight: polymer=100, carbon black=50, zinc oxide=7.5, stearic acid=2.0, resin=5.0, naphthenic oil=5.0, sulfenamide=1.0, and sulfur=1.2. For comparative purposes, a commercial high cis-1,4 polybutadiene polymer was included as a control and was designated Example A. Green strength and tack results are shown in Table V-A.

TABLE V

| Example # | 25 | 26 | 27 |
|---|---|---|---|
| 1,3-BD, % | 20.5 | 20.5 | 20.5 |
| 1,3-BD, grams | 760 | 760 | 760 |
| EtOH, mM phgm | 2.0 | 1.0 | 1.0 |
| TIBAL, mM phgm | 1.0 | 0.5 | 0.5 |
| NiOAL, mM phgm | 1.0 | 0.5 | 0.5 |
| BF$_3$OEt$_2$, mM phgm | 1.0 | 0.5 | 0.5 |
| Molar Ratios: | | | |
| Ni/AL/B | 1:1:1 | 1:1:1 | 1:1:1 |
| EtOH/Ni | 2:1 | 2:1 | 2:1 |
| Type Catalyst Addition | Preformed | → | → |
| Polymerization Conditions: | | | |
| Temp °C. | 85 ± 8 | 85 ± 8 | 85 ± 8 |
| Time-Hrs. | 3 | 5 | 7 |
| Conversion % | 90.8 | 82.4 | 87.9 |
| Polymer Properties | | | |

TABLE V-continued

| | | | |
|---|---|---|---|
| DSV | 2.72 | 3.43 | 3.84 |
| % Gel | 0 | 0 | 0 |
| Mw ($\times 10^{-5}$) | 4.48 | 6.10 | 7.42 |
| Mw/Mn | 4.30 | 4.74 | 4.62 |
| ML-4 at 100°C. | 43 | 68 | 80 |
| Microstructure | | | |
| % Cis-1,4 | 95.9 | 96.2 | 95.7 |
| % Trans-1,4 | 2.8 | 3.0 | 3.6 |
| % 1,2 | 1.3 | 0.8 | 0.7 |

| | Green Strength | | | | |
|---|---|---|---|---|---|
| Polymer Example | Initial PSI | Peak PSI | Break PSI | Elong. % | Tack PPI** |
| A (Control)* | 20 | 35 | 25 | 710 | 0 |
| 25 | 20 | 45 | 35 | 1250 | 7 |
| 26 | 30 | 55 | 1250 | 10 | |
| 27 | 40 | 60 | 60 | 1250 | 12 |

*A cobalt-catalyzed polybutadiene polymer having a cis-1,4 content of 98% and a Mooney viscosity, ML-4 @ 100° C. of 46, available from Polysar Company under the designation CB220.
**PPI means pounds per inch.

I claim:
1. A catalyst composition comprising:
   (a) a carboxylated metal oxy aluminate compound selected from the group consisting of compounds represented by the formulae (RCOOMO—)$_3$AL and (RCOOMO—)$_2$ALOR', wherein R and R' are alkyl radicals containing from 7 to 17 carbon atoms, and M is nickel or cobalt;
   (b) an organometallic compound in which the metal is selected from Groups I, II, and III of the Periodic System; and
   (c) one or more fluorine containing compounds selected from the group consisting of boron trifluoride complexes with ethers, alcohols or mixtures thereof; hydrogen fluoride; hydrogen fluoride complexes with ethers, alcohols or mixtures thereof and mixtures of said compounds.
2. The catalyst composition of claim 1 wherein said carboxylated metal oxy aluminate compound is represented by the formula (RCOOMO—)$_3$AL, wherein R is an alkyl radical containing from 7 to 11 carbon atoms and M is nickel or cobalt.
3. The catalyst composition of claim 1 wherein said organometallic compound is an organometallic compound selected from the group consisting of organoaluminum, organolithium, organomagnesium, and organozinc compounds.
4. The catalyst composition of claim 1 wherein said organometallic compound is triisobutyl aluminum.
5. The catalyst composition of claim 1 wherein said organometallic compound is n-butyl lithium.
6. The catalyst composition of claim 1 wherein said boron trifluoride complex is a boron trifluoride complex with an ether represented by the formula R'OR, wherein R and R' may be alkyl, cycloalkyl, aryl, alkaryl, and arylalkyl radicals containing from 1 to 30 carbon atoms and wherein R and R' may be the same or different.
7. The catalyst composition of claim 1 wherein said boron trifluoride ether complex is boron trifluoride diethyl ether.

8. The catalyst composition of claim 1 wherein said boron trifluoride complex is a boron trifluoride complex with an alcohol represented by the formula ROH, wherein R is an alkyl, cycloalkyl, aryl or arylalkyl radical containing from 1 to 30 carbon atoms.

9. The catalyst composition of claim 1 wherein said boron trifluoride alcohol complex is a boron trifluoride-ethanol complex or a boron trifluoride-octanol complex.

10. The catalyst composition of claim 1 wherein the molar ratio of components a:b:c of the catalyst composition ranges from about 1:1:1 to about 1:70:70.

11. The catalyst composition of claim 1 wherein the molar ratio of components a:b:c ranges from 1:1.5:1.5 to 1:15:15.

* * * * *